Figure 1:
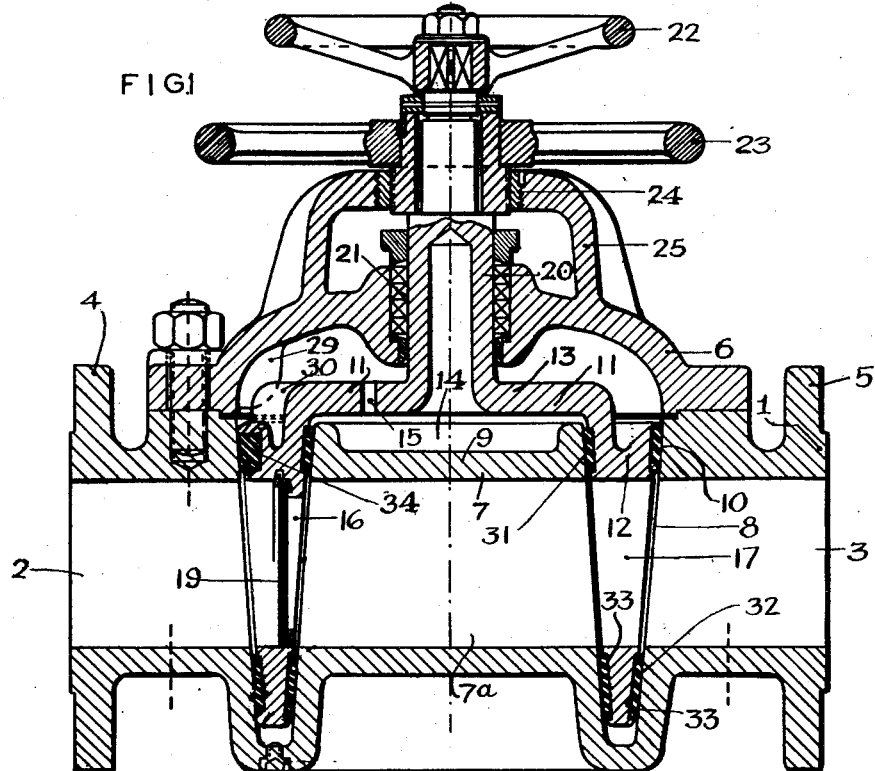

May 3, 1955 W. A. G. OVERDIJK 2,707,488
ORIFICE PLATE
Filed Dec. 23, 1949

Inventor
Willebrordus A.G. Overdijk
by Stevens, Davis, Miller & Mosher
his attorneys United States Patent Office 2,707,488
Patented May 3, 1955

2,707,488

ORIFICE PLATE

Willebrordus A. G. Overdijk, The Hague, Netherlands

Application December 23, 1949, Serial No. 134,728

Claims priority, application Netherlands October 24, 1949

4 Claims. (Cl. 138—44)

The invention relates to a device provided with an orifice plate or such like measuring means for lines through which a fluid flows.

Orifice plates or measuring means in lines through which a fluid flows, such as oil under pressure, must be replaced at more or less short intervals. In order to do this a valve is provided before and behind the measuring equipment, while a bypass with a valve is necessary so as not to interrupt the flow of fluid. Due to this auxiliary equipment the installation of measuring means in a line does not only become an expensive matter, but also much time is required for replacing an orifice plate by another one. This is a considerable drawback for devices the orifice plate of which must often be replaced.

The above mentioned drawbacks are obviated by the device according to the invention by the fact that it comprises a box provided with a round bore receiving a plug of circular cross section adapted to be turned by actuating means and having at least four passages, in at least one of which an orifice plate or like measuring means is arranged, said box having at least three nipples, two of which serving for connecting the equipment with the line and the third one being provided with a removable cover, so that in one position of the plug the orifice plate or like measuring means is lying in the flow of fluid and in the other position same is lying in the nipple provided with the removable cover. For replacing the orifice plate or measuring means it is sufficient to give the plug an angular displacement of for example 90°, when after removing the cover of the corresponding nipple the old orifice plate or measuring means can be replaced by another one. After returning the removed cover to its place the plug is turned back over its angular displacement.

According to the invention a sealing ring, for example of hard rubber or such like material, may be provided on either side of and around the passages in the plug. With a view to an easy applying of the grooves in the plug receiving the seal said grooves are preferably shaped such that they present a bottom lying in a flat surface. The sealing rings should then be constructed with such differences of thickness that they extend beyond the plug surface after applying them in the grooves.

According to the invention the plug space may be in free communication with the box-space outside of the plug, thus causing the same pressure to prevail in both spaces.

In order to make certain that the plug is always in the correct position the box and/or the plug may according to the invention be provided with stops. On actuating the device, it may be turned until the stops touch each other, thus assuring that the plug is in its correct position. If desired the device may be locked in its determined position.

In order to facilitate the turning of the plug same may be provided with a mechanism with the aid of which the plug may be lifted somewhat before turning it, so that only little force will be necessary for the turning operation.

According to the invention an orifice plate or other measuring means may be arranged in two passages of the plug. In that case the plug may be given such an angular displacement that either of the measuring means may be brought subsequently in front of the line and into the space of the nipple provided with a removable cover. In this embodiment it is only necessary to open the cover of the nipple half of the time as otherwise required in the case of a device fitted with only one measuring means. If desired it would be possible to provide more than two measuring means in the device, provided that the plug be arranged with a corresponding number of passages.

Figure 2:
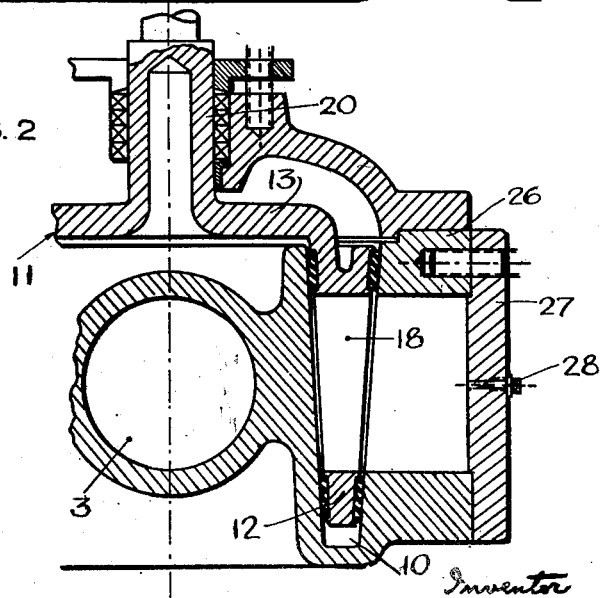

The invention will be better understood from the following description of a preferred embodiment thereof, shown by way of example in the accompanying drawing, in which Figure 1 is a longitudinal section of the device;

Figure 2 is a part cross section.

Referring now more particularly to the accompanying drawing, the device comprises a box or housing 1 provided at its ends with fluid passages 2 and 3, which are shown in alignment and which are in fluid communication. At the outer end of the passage 2, a flange 4 is exteriorly formed on the housing and, similarly, a flange 5 is provided at the end of the passage 3, the flanges providing the means for mounting the housing in a line for a liquid or gaseous fluid so that the fluid flows through the passages 2 and 3. The housing 1 has a cover 6 and beneath the cover a frusto-conical stud 7 is provided, the stud being interposed between the inner ends of the passages and forming a conical seat or groove 8 with the inner wall of the housing. The stud upstands from the bottom wall of the housing and has its upper end 9 protruding through an opening 10 formed in the top wall of the housing. The cover 6 is provided to close off the opening 10.

The stud 7 has a passage 7a formed transversely therethrough, the passage communicating the passages 2 and 3. The conical seat or groove 8 has a closed lower end in the bottom wall of the housing and its upper end is open, the upper end being defined by the periphery of the opening 10 in the upper wall of the housing.

A frusto-conical plug 11 is rotatably mounted on the stud, the plug being hollow and having a circular side wall 12 that overlies the top of the stud. A space 14 is provided therebetween and the upper end 13 has an opening 15 formed therein so that the space 14 is in communication with the space above the plug causing the same pressure to prevail in both spaces.

The side wall 12 of the plug is formed with at least four ports arranged substantially at right angles to each other. Only three of the ports 16, 17 and 18 are shown in the drawing. It is to be noted from considering ports 16 and 17 in Fig. 1, that two of the ports are in alignment with each other and the other two ports are in alignment with each other. Thus, in one position, fluid from, for example, passage 2 will flow through port 16, stud passage 11, port 17 into passage 3. In a 90° turned position of the plug, the fluid would flow through port 18 and its companion aligned port. An orifice plate 19 of conventional construction is removably mounted on the plug to close off the port 16 so that fluid flows through the orifice plate, when the ports 16 and 17 are lined up with the passages 2 and 3.

A spindle 20 for the plug upstands therefrom and is sealingly extended through the cover by means of a packing 21. The plug is turned by means of a hand wheel 22 on the spindle. To assist in the rotation of the plug, a hand wheel 23 is provided and is fixed on a sleeve 24 which is threaded in a portion 25 of the cover and which is freely circumposed on the spindle and abuts the hub of the wheel 22 and the shoulder on the spindle. By the axial movement of the sleeve, the hand wheel is used to lift the plug slightly upward.

Offset from the fluid passages and out of fluid communication therewith, a nipple 26 is provided, as shown in Fig. 2. When the plug is rotated 90°, the port 16 is moved into registry with the nipple but the fluid flow is maintained, since the fluid will flow through port 18 and its companion port. The nipple 26 has a removable cover 27 by means of which an old orifice plate is removed and a new one inserted. The cover 27 has an air release plug 28.

To limit the rotative movement of the plug so that the port having the orifice plate will register completely with the nipple and so that the ports in the nipple will be properly aligned with the passages 2 and 3 and the stud passage, stops 29 and 30 are provided, as shown in Fig. 1.

Sealing rings 31, 32 are provided on both sides of the plug alongside and framing the ports. The rings are preferably formed from hard rubber and may be manufactured in the required shape, being of equal thickness everywhere. The grooves 33, which are formed on the plug, are of the same depth over the whole circumference and should be made in accordance with the curvature of the plug. The sealing grooves may, however, also be formed in such a way that their bottom comes to lie in the same plane. In such a case, the sealing rings will not be of the same thickness everywhere, as indicated by the ring 34.

The operation of the device is as follows:

In case the orifice plate is to be replaced, the plug 11 is lifted slightly by means of the hand wheel 23. It is to be understood that in its normal position, the orifice plate would be transversely interposed, by means of the plug, between the passages 2 and 3, since the ports 16 and 17 are aligned with the passages 2 and 3 and the plate is mounted over the port 16. The plug is rotated 90° by means of the hand wheel 22 to move the orifice plate 19 out of the flow line and bring it into registry with the nipple 26. In this position, the plug presents its port 18 and its companion port to the flow line so that the flow is not interrupted. After the air release plug 28 is then opened to effect a compensation of pressure, the cover 27 is opened and the orifice plate 19 is removed and a new one mounted in place. The cover 27 and air release plug 28 are then closed and the plug returned to its normal position with the orifice plate in the flow line.

It will be obvious that the device described above and represented in the drawing is only given by way of example and that same may be varied in different ways without leaving the scope of the invention. For example it is possible to fit a four passage plug with an orifice plate 19 or the like measuring means in two passages lying next to one another. In that case the plug may be given such angular displacement that both orifice plates or measuring means may be brought opposite the nipple 26. In order to assure anyway the correct position of the plug 11 it may be equipped with removable stops. It is, however, also possible to apply a nipple with removable cover opposite the nipple 26 on the other side of the box.

I claim:

1. An orifice fitting comprising a housing having fluid passages in fluid communication therein, a conical stud disposed in the housing between the fluid passages and having a fluid passage therethrough in alignment with the fluid passages in the housing, said housing having an inner wall and said stud forming with the inner wall an annular groove open at its upper end, a tapered plug of circular cross section rotatably arranged in said groove around the stud and interposed between the fluid passages, said plug having at least four ports in it arranged at an angle to each other, an orifice plate removably mounted in at least one of said ports and enclosing said port, said housing having at least one nipple, said nipple lying in the same horizontal plane as the fluid passages and being offset therefrom and in communication with the plug, said nipple and said fluid passages in the housing cooperating with said ports whereby on rotation of said plug two of said ports may be brought into registry and into alignment with the two fluid passages in the housing to establish fluid communication therebetween and at least one of the other ports may be brought into registry with the nipple, sealing means between the edges of said ports and the cooperating surfaces of said seat, the two first-mentioned ports being in alignment with the two fluid passages in the housing and being also in alignment with the fluid passage in the stud so that the fluid may pass unrestrictedly through said passages during normal functioning of the fitting as well as when replacing the orifice plate by another one, said nipple being provided with a removable closure means through which the orifice plate may be removed and replaced by another orifice plate, and means for rotating said plug.

2. An orifice fitting comprising a housing having fluid passages in fluid communication therein, a conical stud disposed in the housing between the fluid passages and having a fluid passage therethrough in alignment with the fluid passages in the housing, said housing having an inner wall and said stud forming with the inner wall, an annular groove open at its upper end, a tapered plug of circular cross section rotatably arranged in said groove around the stud and interposed between the fluid passages, said plug having at least four ports in it arranged at an angle to each other, an orifice plate removably mounted in at least one of said ports and enclosing said port, said housing having at least one nipple, said nipple lying in the same horizontal plane as the fluid passages and being offset therefrom and in communication with the plug, said nipple and said fluid passages in the housing cooperating with said ports whereby on rotation of said plug two of said ports may be brought into registry and into alignment with the two fluid passages in the housing to establish fluid communication therebetween and at least one of the other ports may be brought into registry with the nipple, sealing means between the edges of said ports and the cooperating surfaces of said seat, the two first-mentioned ports being in alignment with the two fluid passages in the housing and being also in alignment with the fluid passage in the stud so that the fluid may pass unrestrictedly through said passages during normal functioning of the fitting as well as when replacing the orifice plate by another one, said nipple being provided with a removable closure means through which the orifice plate may be removed and replaced by another orifice plate, and means for rotating said plug, the sealing means being mounted in grooves in the conical plug, and said grooves having a bottom lying in a flat plane.

3. An orifice fitting comprising a housing having fluid passages in fluid communication therein, a conical stud disposed in the housing between the fluid passages and having a fluid passage therethrough in alignment with the fluid passages in the housing, said housing having an inner wall and said stud forming with the inner wall an annular groove open at its upper end, a tapered plug of circular cross section rotatably arranged in said groove around the stud and interposed between the fluid passages, said plug having at least four ports in it arranged at an angle to each other, an orifice plate removably mounted in at least one of said ports and enclosing said port, said housing having at least one nipple, said nipple lying in the same horizontal plane as the fluid passages and being offset therefrom and in communication with the plug, said nipple and said fluid passages in the housing cooperating with said ports whereby on rotation of said plug two of said ports may be brought into registry and into alignment with the two fluid passages in the housing to establish fluid commounication therebetween and at least one of the other ports may be brought into registry with the nipple, sealing means between the edges of said ports and the cooperating surfaces of said seat, the two first-mentioned ports being in alignment with the two fluid passages in the housing and being also in alignment with the fluid passage in the stud so that the fluid may pass unrestrictedly through said passages during normal functioning of the fitting as well as when replacing the orifice plate by another one, said nipple being provided with a removable closure means through which the orifice plate may be removed and replaced by another orifice plate, and means for rotating said plug, a space being provided in said housing above the plug and a space between the plug and the stud communicating with said space so that the same pressure prevails in both spaces.

4. An orifice fitting comprising a housing having fluid passages in fluid communication therein, a conical stud disposed in the housing between the fluid passages and having a fluid passage therethrough in alignment with the fluid passages in the housing, said housing having an inner wall and said stud forming with the inner wall, an annular groove open at its upper end, a tapered plug of circular cross section rotatably arranged in said groove around the stud and interposed between the fluid passages, said plug having at least four ports in it arranged at an angle to each other, an orifice plate removably mounted in at least one of said ports and enclosing said port, said housing having at least one nipple, said nipple lying in the same horizontal plane as the fluid passages and being offset therefrom and in communication with the plug, said nipple and said fluid passages in the housing cooperating with said ports whereby on rotation of said plug two of said ports may be brought into registry and into alignment with the two fluid passages in the housing to establish fluid communication therebetween and at least one of the other ports may be brought into registry with the nipple, sealing means between the edges of said ports and the cooperating surfaces of said seat, the two first-mentioned ports being in alignment with the two fluid passages in the housing and being also in alignment with the fluid passage in the stud so that the fluid may pass unrestrictedly through said passages during normal functioning of the fitting as well as when replacing the orifice plate by another one, said nipple being provided with a removable closure means through which the orifice plate may be removed and replaced by another orifice plate, and means for rotating said plug, the plug being provided with means for slightly lifting it before rotating it.

References Cited in the file of this patent

UNITED STATES PATENTS

| | | |
|---|---|---|
| 891,076 | Jarmolowsky | June 16, 1908 |
| 1,049,450 | Caskey | Jan. 7, 1913 |
| 1,097,196 | Sperr | May 19, 1914 |
| 1,496,584 | McCrink | June 3, 1924 |
| 2,352,368 | Burnett | June 27, 1944 |
| 2,354,967 | Perry | Aug. 1, 1944 |